L. N. CATES.
DENTAL TOOL.
APPLICATION FILED MAY 8, 1919.
1,316,685.
Patented Sept. 23, 1919.
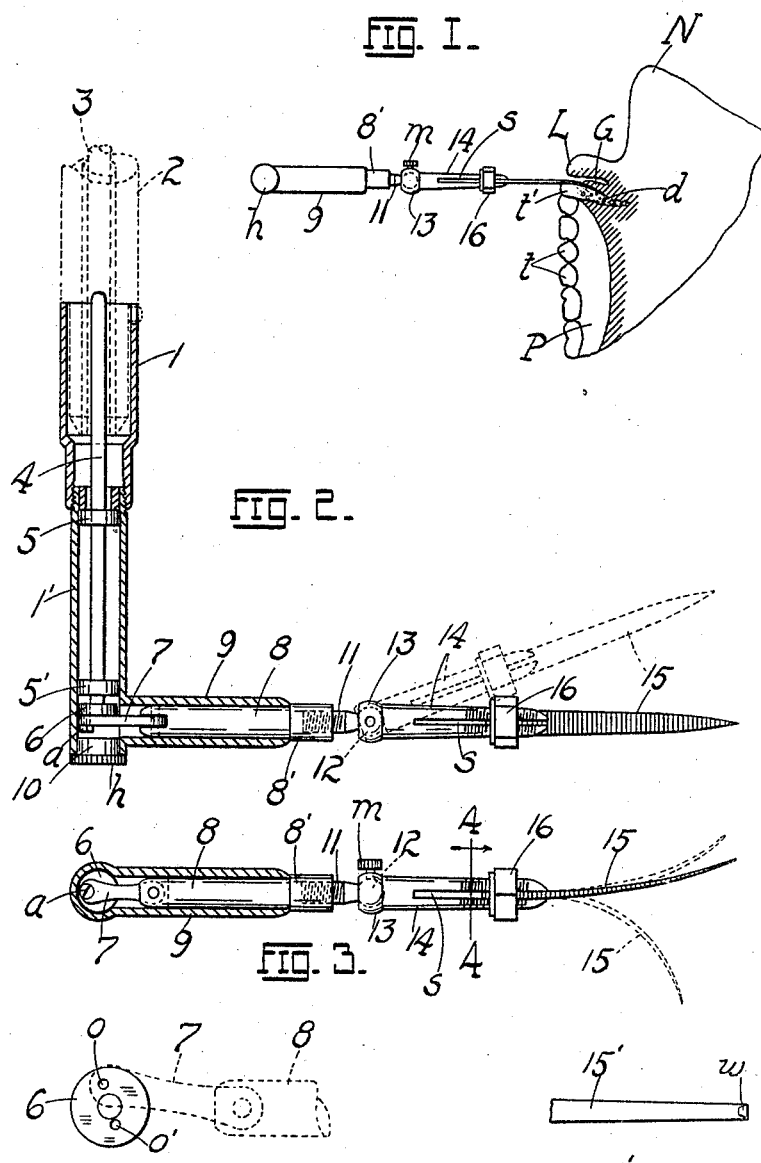
INVENTOR.
Lorwin N. Cates.
BY Emil Starek
ATTORNEY.
WITNESSES:
Harry A. Being
M. D. Taylor

UNITED STATES PATENT OFFICE.

LORWIN N. CATES, OF ST. LOUIS, MISSOURI.

DENTAL TOOL.

1,316,685.  Specification of Letters Patent.  Patented Sept. 23, 1919.

Application filed May 8, 1919. Serial No. 295,652.

*To all whom it may concern:*

Be it known that I, LORWIN N. CATES, a citizen of the United States, residing at St. Louis, State of Missouri, have invented certain new and useful Improvements in Dental Tools, of which the following is a full, clear, and exact description, reference being had to the accompanying drawings, forming a part hereof.

The present invention is directed to improvements in dental tools, and particularly to a type used in the treatment of pyorrhea for the removal of pyorrheal growths or deposits between the root of the tooth and the gum. The object of the improvement is to provide a tool with a detachable bit or scraper thereby permitting the employment of a variety of such scrapers; to provide a suitable joint between the tool handle and scraper which will permit of various rotary and angular adjustments of the scraper relatively to the handle; to provide a simple means for reciprocating the tool; to provide means for varying the length of the stroke of the tool; to provide a scraper which is flexible, readily insertible between the root of the tooth and the gums; and finally to provide a tool having various and sundry advantages better apparent from the following detailed description in connection with the accompanying drawings in which—

Figure 1 represents a more or less diagrammatic median section of the palate showing my invention applied to the incisor; Fig. 2 is an enlarged side elevation of the tool with parts in section; Fig. 3 is a view of the tool and tool-holder taken at right angles to Fig. 2, the leg of the angle fitting carrying the reciprocating piston or plunger being in section; Fig. 4 is an enlarged cross-section on the line 4—4 of Fig. 3 taken through the tool-holder; Fig. 5 is a detached plan of the crank disk actuating the piston; Fig. 6 is a plan of a modified form of tool or scraper; and Fig. 7 is an edge view thereof.

Referring to the drawings, and for the present to Figs. 1 to 5 inclusive, P represents the palate, $t$ the teeth, G, the gum, L, the upper lip, and N, the nose as well understood by those skilled in the art. The incisor $t'$ is herein represented as the diseased tooth to be treated, the root of the same being shown as covered with a pyorrheal deposit $d$ which is intended to be removed or scraped from the tooth by the proper application of my improved tool.

The tool comprises a hollow handle 1 terminating the tubular member 2 leading from any conventional form of dental engine (not shown), said engine imparting rotation to a shaft 3 adapted to be coupled in any suitable mechanical manner to the shaft 4 traversing the handle 1 and the adjacent tubular leg or member 1' forming an extension of the handle 1 to which the member 1' is preferably screwed. The shaft 4 is supported in the member 1' at two points by the bearings 5, 5', said shaft terminating just beyond the bearing 5' in a disk 6 to which may be coupled at different distances from the axis of the disk, the adjacent end of a link 7, the opposite end of the link being pivotally secured to a plunger or piston 8 reciprocable in the leg or tube 9 formed integrally with the tube 1' and disposed at right angles thereto, the tubes 1' and 9 forming a single fitting secured to the handle 1. The end of the tube 1' beyond the point of intersection with the tube 9 is closed by a plug 10 having a milled head $h$, the purpose of the plug being to gain access to the link 7 whenever it becomes desirable to change the point of connection of the link with the disk. This is done by shifting the crank pin $a$ by which the link is coupled to the disk 6 from one hole $o$ to the other $o'$ (Fig. 5) or vice versa, depending on the length of stroke desired for the piston 8 and the tool coupled thereto. The outer end of the plunger or piston 8 terminates in a head 8' to which is screwed a stem 11 terminating in a spherical head or ball 12 which receives a socket 13 formed at the base of the tool holder or shank 14, the members 12 and 13 forming a ball-and-socket joint permitting the holder 14 to be adjusted in any desired direction. A set-screw $m$ carried by the socket 13 insures a rigid connection therefor with the ball 12 should the joint for any reason work loose. The holder 14 is in the form of a stem tapering to a point at its free end, the outer half of the stem being screw-threaded and being slit longitudinally by two intersecting slits $s$ extending to within a short distance of the socket 13, the slits thus dividing the stem into four spring or resilient gripping arms disposed in pairs, between which the tool or scraper blade 15 may be inserted and then firmly gripped by driving home the nut 16 which plays over the threaded portion of the stem as clearly apparent from the drawings. The tool or scraper 15 may be any instrument which is best suited to remove the pyorrheal deposit from the tooth. The form shown in the figures under consideration is best suited for operating on the incisors and bicuspids, and in Fig. 1 the same is shown inserted between the gum and the incisor $t'$. The tool should be flexible, thin, pliable and resilient and in the form referred to the same is flat, the sides tapering to a point and the faces feathering to an edge. It is moreover serrated transversely so as to operate as a file, the serrations necessarily being fine on account of the character of the work in which the tool is involved.

In Figs. 6 and 7 I show a tool or scraper 15' terminating in a blade $w$ thus giving the tool the appearance of a hoe. Other forms of tools may be devised, the two herein shown being merely by way of example.

It will be seen that by imparting rotation to the shaft 3, a reciprocating movement is imparted to the piston 8 and hence to a tool, the throw or stroke being a fraction of an inch. This may be varied by fastening the link 7 to the disk 6 at different distances from the rotation axis of the disk. The reciprocations of the tool necessarily cause the tool to scrape the deposit $d$ from the tooth and the work can be considerably expedited over the usual hand scraping operation. The ball-and-socket connection between the handle and the tool holder permits of an infinite variety of adjustments, thereby resulting in a practical and highly efficacious dental tool. The tool may of course be changed in many particulars without involving a departure from the nature or spirit of the invention.

Having described my invention, what I claim is—

1. In a dental tool, a suitable handle, a reciprocating piston carried thereby, a tool holder, a flexible joint connecting the holder to the piston, and a tool secured to the holder.

2. In a dental tool, a suitable handle, a reciprocating piston carried thereby, a tool holder, a ball-and-socket joint connecting the holder to the piston, and a tool secured to the holder.

3. In a tool of the character described, a suitable handle, a reciprocating member carried thereby, a tool holder, and a flexible joint connecting the holder to said reciprocating member.

4. In a dental tool, a suitable hollow handle, a hollow fitting secured thereto, a shaft mounted rotatably in the handle, a crank disk secured to the shaft, a piston reciprocating in the fitting, a link connecting the piston to the crank disk, a tool holder, and a flexible joint connecting the holder to the piston.

5. As an article of manufacture a dental tool for pyorrheal treatment comprising a scraping blade composed of a thin strip of metal transversely serrated and tapering on the sides and having faces feathered to an edge, the strip being resilient, flexible, and pliable, as set forth.

6. A dental tool comprising a handle, a tubular angle fitting terminating the same, a shaft mounted in one member or leg of the fitting and terminating at the angle or meeting point of the legs of the fitting, a crank disk on the shaft at the angle aforesaid, a link coupled at one end to the disk at a suitable point from the axis thereof and operating in the adjacent leg of the fitting, a piston in said last mentioned leg coupled to the opposite end of the link, a member terminating in a ball secured to the outer end of the piston, a tool holder having a terminal socket mounted on the ball aforesaid, thereby forming a ball-and-socket joint, and a tool secured to the holder, the parts operating substantially as and for the purpose set forth.

In testimony whereof I affix my signature in presence of two witnesses.

LORWIN N. CATES.

Witnesses:
EMIL STAREK,
ELSE M. SIEGEL.

Copies of this patent may be obtained for five cents each, by addressing the "Commissioner of Patents, Washington, D. C."